F. N. CONNET.
WATER MEASURING APPARATUS.
APPLICATION FILED SEPT. 24, 1913.
1,085,110.
Patented Jan. 27, 1914.
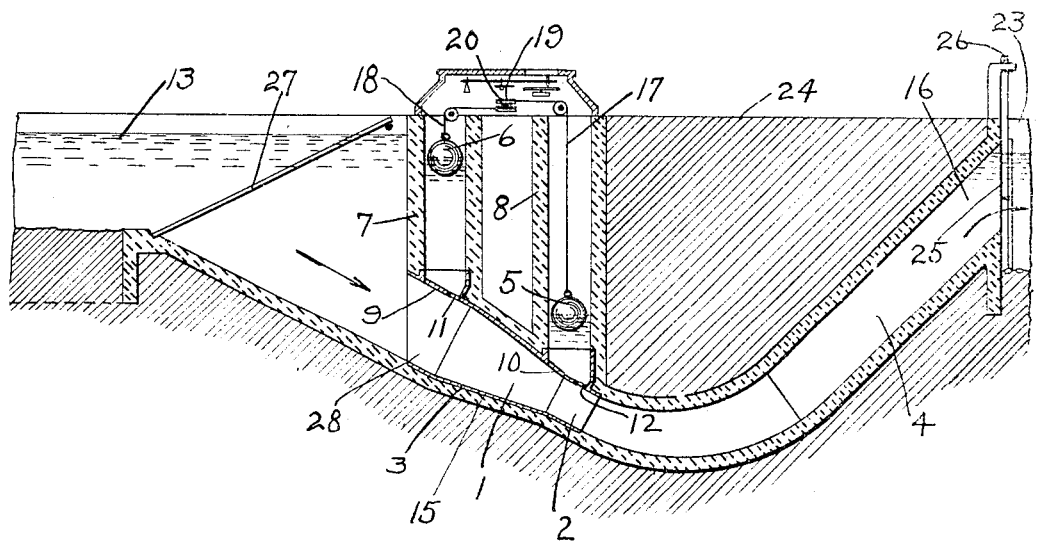
Fig. 1.
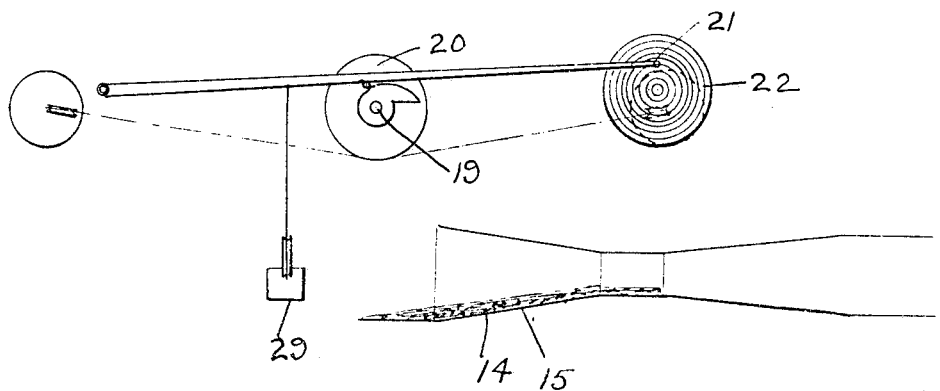
Fig. 2.
Fig. 3.
Witnesses
George M. Kerr
E. I. Ogden
Inventor
Frederick N. Connet
By Howard E. Barlow
Attorney

UNITED STATES PATENT OFFICE.

FREDERICK N. CONNET, OF PROVIDENCE, RHODE ISLAND.

WATER-MEASURING APPARATUS.

1,085,110.  Specification of Letters Patent.  Patented Jan. 27, 1914.

Application filed September 24, 1913. Serial No. 791,639.

*To all whom it may concern:*

Be it known that I, FREDERICK N. CONNET, a citizen of the United States, and resident of the city of Providence, in the county of Providence and State of Rhode Island, have invented certain new and useful Improvements in Water-Measuring Apparatus, of which the following is a specification.

The object of this invention is to provide simple and effective means to be used primarily for measuring irrigation water, the essential feature of the invention being the use of a measuring tube commonly known as the Venturi tube, and to set said tube on an angle or inclination by which setting a number of useful and practical results are obtained over the setting of this tube in a horizontal plane, among others being:—first, the whole of the device need not be set to so great a depth, thus saving the expense of the extra excavating and the expense of extra length of concrete walls for one of the float chambers and other parts; second, the bottoms of both float chambers are naturally set on an incline to facilitate the discharge of the silt therefrom; and third, the setting of this tube on an angle prevents the deposit of silt or sediment at a point in the tube itself where such deposit would interfere with the accuracy of measuring. It is found in the irrigation of land very desirable, and in most cases absolutely necessary for the sake of economy, to accurately measure the water which is distributed to the individual users, so as to prevent the wasteful use of the water, and at the same time stimulate the user to produce the maximum results from the quantity of water consumed. The simplest and most effective way known for accurately measuring water in large quantities is by the use of this Venturi tube through which the water is allowed to flow from the river, or other source of supply, to the ditches on the property to be irrigated.

With these and other objects in view, the invention consists of certain novel features of construction, as will be more fully described and particularly pointed out in the appended claims.

Of the accompanying drawings: Figure 1 is a diagrammatic view illustrating the measuring device set in position under ground for the water to pass therethrough in going from the source of supply to the consumer, the axis of said tube being placed on an incline. Fig. 2 is a detail showing the actuating cam arranged to control the movement of the recording finger over the face of the chart. Fig. 3 is a view showing a portion of a tube, the axis of which is set on a level and indicating the point where the sediment would be deposited and which deposit would interfere materially with the accuracy of the device as a measuring instrument.

The Venturi tube 1 may be constructed of sheet metal, terra-cotta pipe, wood, concrete, or other suitable material. The tube is provided with a contracted neck portion 2 which is connected to the main body on the inlet side by the short tapering or cone-shaped portion 3, the opposite or discharge end 4 of said tube gradually growing larger from said contracted portion to the discharge end.

It is found in practice that where floats are employed in connection with a Venturi tube for controlling the action of exhibiting mechanism that the float 5, connected with the throat portion of the tube, must of necessity have a greater stroke or fall below the surface of the water 13 to be measured than that of the float 6, connected to the upstream side of the tube, therefore to accommodate this difference in stroke, where the float chambers are connected direct to the upper surface of the measuring tube, the upstream float chamber 7 may be considerably shorter than that of the throat float chamber 8. Therefore it will be seen that if the axis of the tube were set on a horizontal plane then the whole tube must be as low as the lowest or throat portion. Therefore it will be seen that in the setting of large tubes where the expense of excavation is an item to be considered that considerable is saved by not being obliged to set the up-stream end of the tube down as low as the neck portion. Another feature in the placing of this tube on an angle is that the up-stream float chamber may be considerably shorter than the throat float chamber, thus again saving in expense by reducing the cost of construction of this up-stream concrete float chamber to the minimum. Then again, by my improved construction the bottom 9 and 10 of each of these float chambers is naturally set on an incline and each is provided with an opening 11 and 12 respectively on their lowest side, whereby the action of the water within the chamber causes the sediment, which is deposited on the bottom thereof, to move along the inclined surface and out of the said opening where it is carried over into the ditch beyond, thus automatically preventing the clogging of the float chambers which would interfere with the accuracy of the action of the exhibiting mechanism.

In addition to the advantages as set forth above in the setting and constructing of the float chambers, there is an additional advantage in the operation of the tube itself, that is, if the axis were set on a level plane, as indicated in Fig. 3, a deposit of sediment would collect at the point 14 and fill up as indicated in said figure, so as to destroy or reduce the efficiency of the tube as a measuring instrument. It will therefore be seen that by setting this tube on an angle or downward inclination, as indicated in Fig. 1, whereby the lower wall 15 of the conical portion is also at a slight downward inclination, that the sediment or other deposits would be carried past the point of measuring where it can do no harm and can be readily removed by the insertion of a scoop, hoe, or other suitable device from the outlet end 16 of the tube.

Another and important advantage in the placing of this Venturi tube on an incline and connecting the float chambers direct to the upper wall thereof, is that it brings the throat sufficiently low to prevent a partial vacuum at the throat during periods of high velocity of flow therethrough. A partial vacuum at the throat is detrimental because if there happens to be a slight flaw or crack in the walls of the tube, which in some cases may be of concrete, there will be a flow of air from the outside to the interior where it will mix with the water and produce foam or bubbles which interfere with the accuracy of measurement. The floats 5 and 6 are carried in their respective chambers to be moved up and down in proportion to the difference in pressures at the two connected points in said tubes, said floats being connected through the cords 17 and 18 respectively to operate the cam 19 through the medium of differential gearing 20 of any suitable construction, to move the marker 21 over the face of the recording sheet 22, which recording sheet is rotated continuously by means of clock work, not shown. The action of this cam is not restricted to the operation of recording mechanism alone, but may be arranged to operate other exhibiting mechanism, not shown, if desired.

In the practical operation of devices of this character the river or source of supply is represented at 13, and the reservoir or ditch for the consumer is represented at 23, with a bank or dam 24 separating the two. When the consumer desires to fill his reservoir or irrigate his land, he opens the gate 25 from the upper end at 26 and the water flows through the grating 27, pipe 28, the measuring tube 1 and pipe 4 from the source of supply 13 through to the reservoir 23, and as the water passes through the measuring tube it causes a difference of pressure between the points 11 and 12 in said tube causing the floats 5 and 6 to change their relative positions, which change actuates the mechanism to mark upon the record sheet and show the quantity which has passed through the meter. When sufficient water has been drawn for immediate use the gate 25 is closed, the floats 5 and 6 return to a common level rotating the cam 19 in a reverse direction. The pointer is held normally at zero by means of a counter balancing weight 29, and when the rotation of cam 19 is reversed the action of the weight 29 is such as to return the pointer to zero.

It will be seen by this method that the exact amount of water used is accurately measured and recorded and each consumer pays only for the amount which he has used. In this way it is found that the consumer is bound to use the water most economically and raise the maximum amount of produce by the use of the given amount of water.

I claim:

1. A fluid measuring apparatus comprising a tube having a contracted portion or throat, means for exhibiting the amount of flow through the tube, said means including two float chambers one connected to the upstream portion and the other to the throat portion of said tube and said tube being set on an incline whereby one of said chambers may be shorter than the other, and whereby a positive liquid pressure is assured at the throat.

2. An apparatus for measuring combined fluids and solids comprising a tube through which the material passes, said tube being provided with a contracted portion or throat, means for exhibiting the amount of flow through said tube, said means including two float chambers one connected to the upstream portion and the other to the throat portion of said tube, said tube being set on an incline whereby one of said chambers may be made shorter than the other and also to prevent the deposit of sediment in the tube at or between the points of connection of said float chambers, and whereby a positive liquid pressure is assured at the throat.

In testimony whereof I affix my signature in presence of two witnesses.

FREDERICK N. CONNET.

Witnesses:
  HOWARD E. BARLOW,
  E. I. OGDEN.